May 5, 1936.                G. W. POPPE                2,039,980
            MACHINE AND PROCESS FOR MAKING BAGS
                Filed Sept. 30, 1932        6 Sheets-Sheet 1

INVENTOR
GEORGE W. POPPE
BY
Newell & Spencer
ATTORNEYS

May 5, 1936.　　　G. W. POPPE　　　2,039,980
MACHINE AND PROCESS FOR MAKING BAGS
Filed Sept. 30, 1932　　　6 Sheets-Sheet 4

INVENTOR
GEORGE W. POPPE
BY
Newell & Spencer
ATTORNEYS

May 5, 1936.  G. W. POPPE  2,039,980
MACHINE AND PROCESS FOR MAKING BAGS
Filed Sept. 30, 1932  6 Sheets-Sheet 6

INVENTOR
GEORGE W. POPPE
BY
Newell & Spencer
ATTORNEYS.

Patented May 5, 1936

2,039,980

UNITED STATES PATENT OFFICE 2,039,980

MACHINE AND PROCESS FOR MAKING BAGS

George W. Poppe, Brooklyn, N. Y., assignor to Equitable Paper Bag Co., Inc., Brooklyn, N. Y., a corporation of New York Application September 30, 1932, Serial No. 635,533

4 Claims. (Cl. 93—35)

This invention relates to a process and machine for making bags and more particularly to the making of bags from relatively thin material. The improvements, however, are not limited to the process and machine for handling thin material but possess advantages when making bags of ordinary paper.

An object of the invention is the better control and handling of the bag material both in the web and in the tube. A further object is the production of a more attractive and serviceable bag at minimum cost.

A feature of the invention resides in the provision of positive feeding means engaging the web prior to folding the same into a bag tube.

Another feature relates to the provision of means whereby a very accurate adjustment of the feed rollers may be had and maintained, and to insure uniform pressure of the rollers against the bag tube.

A further feature relates to the provision of a central bearing for the upper pinch bar shaft whereby the pinch bar carried thereby will perform its function in a more reliable manner notwithstanding the vibrations to which the shaft is subjected during the severance of the bag tube.

Still another feature relates to the provision of means whereby the pinch bar shafts and striker bar may be more accurately and conveniently adjusted in proper timed relation.

Further features relate to the construction and mode of operation of the paste applying disc, the control of the auxiliary web feeding roller, rollers acting on the tube together with other features and advantages which will become apparent and will be better understood from the following description and claims when taken in connection with the accompanying drawings in which:—

Figure 13 is part sectional and part plan view of a portion of the rear of the machine substantially along the line 13—13, Figure 1, showing the paste applying mechanism, Figure 14 is a detail of the shaft carrying the paste applying disc;

Figure 14a is a detail of a modified form of paste applying disc;

Figure 14b is a section on the line 14b—14b, Figure 14a;

Figure 15 is a section on the line 15—15, Figure 13;

Figure 1:
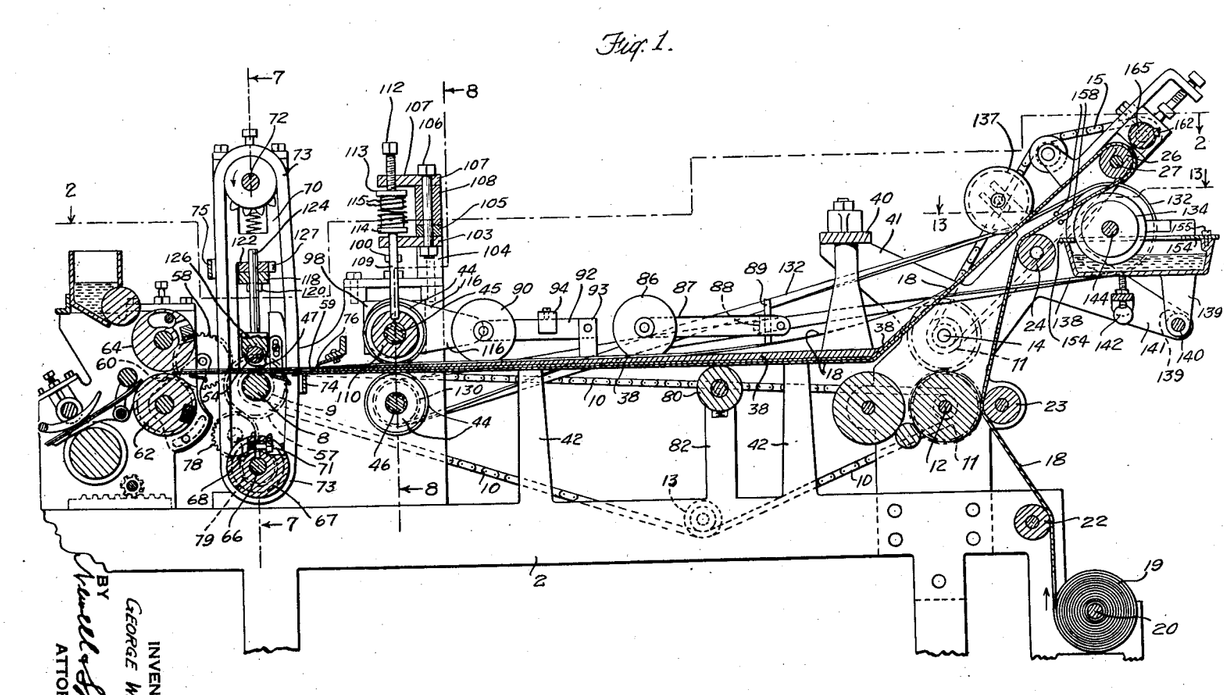
Figure 1 is a longitudinal section of a bag machine embodying my improvements.
Figures 2, 20:
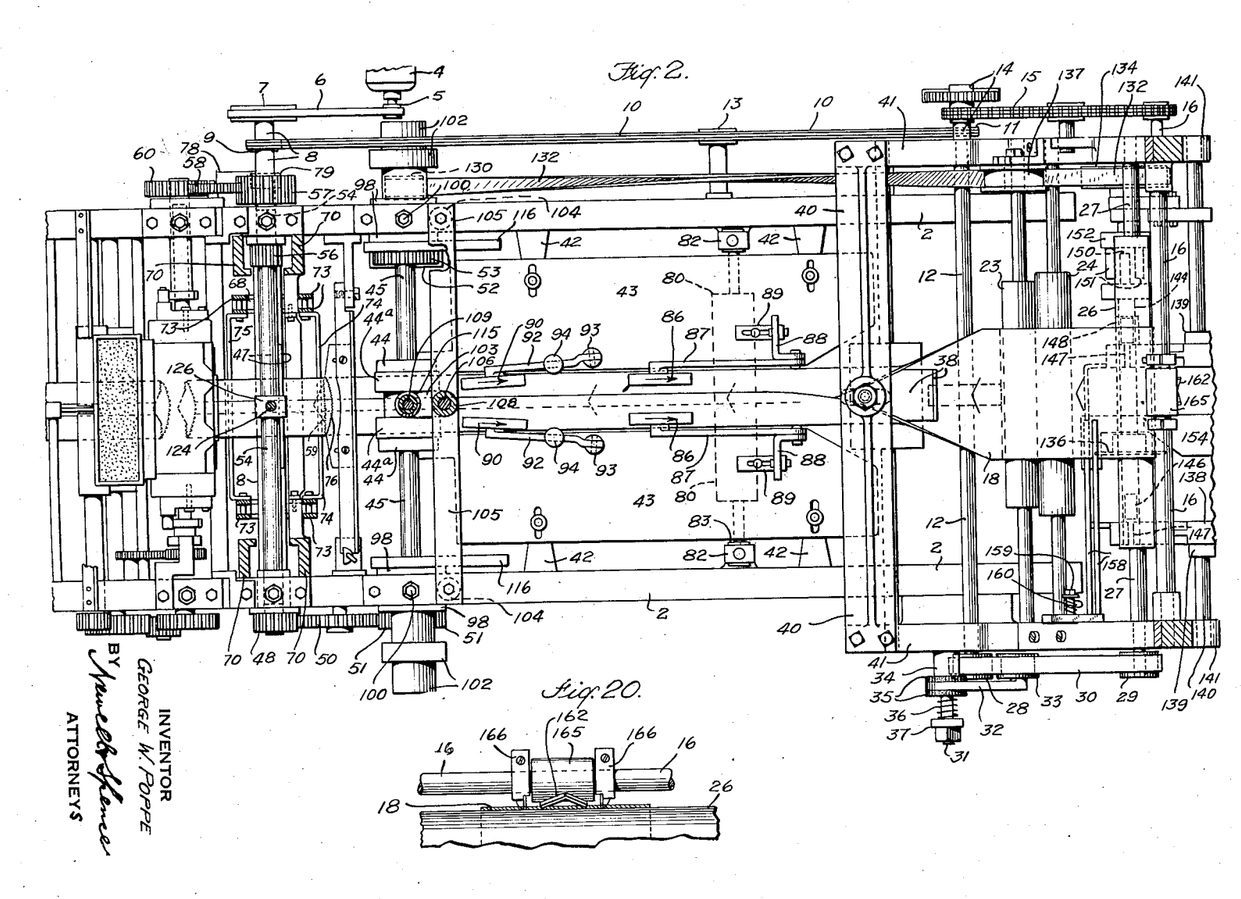
Figure 2 is a plan and part sectional view on the line 2—2, Figure 1.
Figure 20 (Sheet 2) is a detail of the shaft carrying dies for making incisions in the web such as shown in Figure 17.

Referring to the drawings, and more particularly to Figures 1 and 2 there is the usual supporting framework 2, the side members of which carry the various shafts for driving the usual mechanism of a bag machine, together with brackets for supporting the various auxiliary structures with which the present invention is more particularly concerned.

Referring to Figure 2, the machine is driven from a motor 4 whose shaft is provided with a pulley 5 about which passes a belt 6 to a pulley 7 on the shaft 8, which carries the lower pinch roller and from which shaft most of the other parts receive their drive. On this shaft is also carried a sprocket wheel 9, Figure 7, over which passes a sprocket chain 10 connected to a sprocket 11 on shaft 12, Figures 2 and 3. A tension roller 13 is provided to keep the sprocket chain sufficiently taut. The shaft 12 carries a gear that meshes with a similar gear on a stud shaft 14.

The latter shaft carries a sprocket wheel for engagement with a sprocket chain 15 by which motion is transmitted to shaft 16, the latter shaft carrying dies for making incisions in the paper web in a manner to be later described.

The paper or other material which is to form the bags is fed as a web 18 from a roll 19 supported on a shaft 20 in the lower portion of the rear framework. The web passes over guide rollers 22, 23, and 24 and around another roller 26 which reverses its direction of movement, the latter roller being carried by shaft 27.

The mechanism so far described is that which is found in an ordinary bag machine and is of well-known construction. In said machines, however, the roller 26 serves merely to reverse the direction of the web but is not itself positively driven.

In the present disclosure means are provided for positively driving the roller 26 thereby relieving somewhat the strain on the paper or other bag forming material and permitting thinner and more delicate material to be used to advantage.

For positively driving the roller 26 a pulley 28 is secured to the lower end of shaft 12 as viewed in Figure 2, the shaft 27 being provided with a similar pulley 29, the pulleys being connected by a belt 30.

Figures 3, 4, 5, 6:
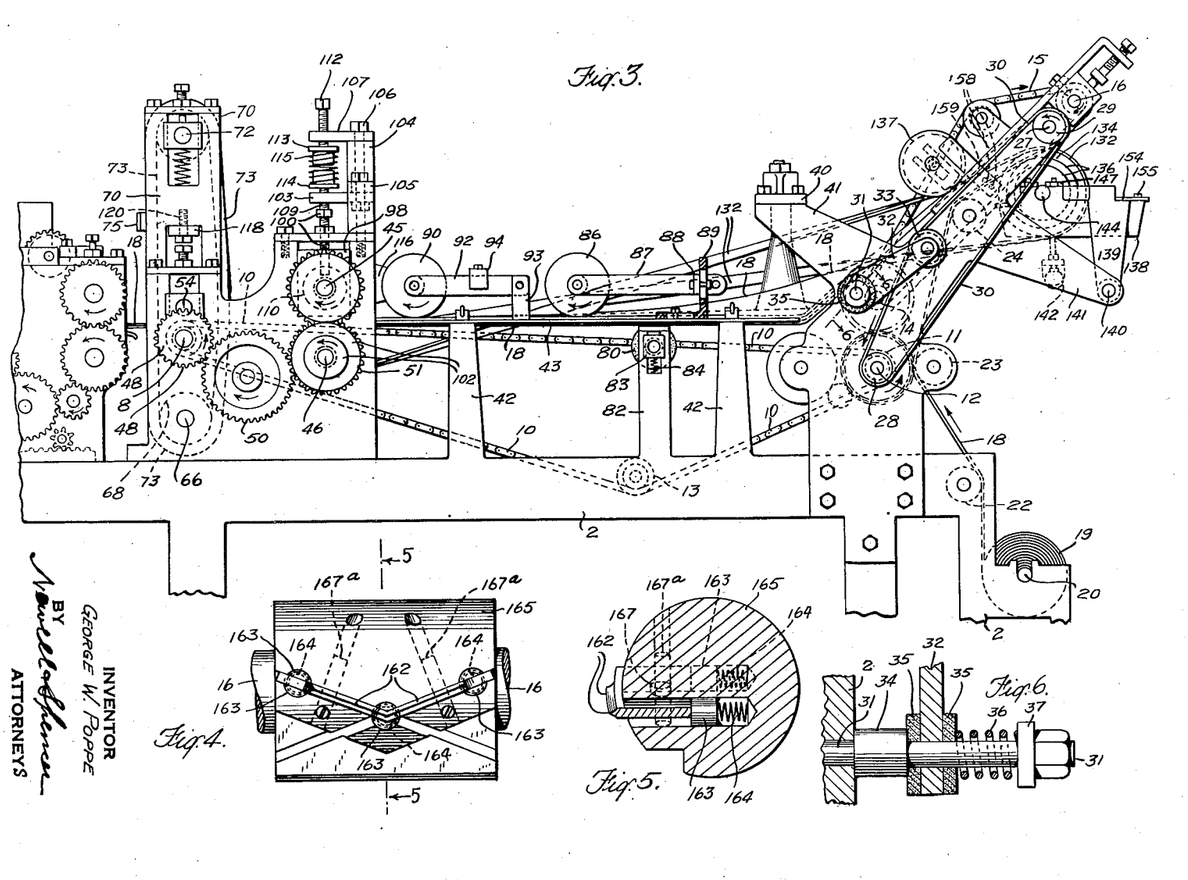
Figure 3 is a side elevation viewed from the bottom of Figure 2.
Figure 4 is an enlarged detail view of the die for making an incision in the web.
Figure 5 is a detail sectional view on the line line 5—5, Figure 4.
Figure 6 is an enlarged sectional view on the line 6—6, Figure 3.

When first setting up the machine the paper is threaded into the machine by hand and it is necessary to give some motion to the parts in order that the web may be properly started. With the roller 26 positively driven this operation would be very difficult unless means were provided to ease up on the belt 30 during the setting-up operation. I have therefore provided variable tension mechanism for this belt constructed as follows: A stud shaft 31 projects from the side frame plate 2 as indicated in Figure 6, said shaft carrying an arm 32 supporting a pulley 33, Figure 3. Between the arm 32 and the side frame plate 2 is interposed a collar 34 and friction washers 35 are provided on either side of the arm and a spring 36 is interposed between a nut 37 and the outside washer. This gives sufficient tension to the arm 32 to hold it in any position to which it is positively moved. Normally the arm is positioned as shown in Figure 3 and the roller 33 bears on the belt 30 with such pressure as will enable it to drive the roller 26. When, however, the web is being initially threaded through the machine the roller 33 is moved away from the outer surface of the belt thereby permitting sufficient slack to allow the roller 26 to turn freely.

The mechanism just described for controlling the drive of the paper web is not specifically claimed in the present application but is claimed in my divisional application Serial No. 676,871, filed June 21, 1933.

The paper web after passing over the roller 26 is delivered to mechanism which folds it into the bag tube in the usual manner, such mechanism including a former plate 38, the right end of which, as indicated in Figure 1, is bent upwardly at about 45°. The former is supported from a bridge 40 carried by arms 41 projecting forwardly and upwardly. The web passes under the former and is folded over onto it as illustrated in Figure 2. Projecting upwardly from the side plates 2 are four standards 42 which support two plates 43, Figure 2, the plates being separated sufficiently to permit the bag tube to freely move between them. Adjustment of the plates to and from each other is effected by slotting the plates as shown in Figure 2 and providing set screws to hold them in the proper adjustment. These plates 43 support rollers which aid in giving the necessary control of the folded web and will be referred to later in greater detail.

The folded tube passes to the feed rollers indicated at 44, the upper pair of which are mounted on shaft 45 and the lower pair on shaft 46, these shafts extending into and being supported by the side frames of the machine. Preferably the upper rollers are provided with facings 44a of rubber, leather or other material such as will provide the desired surface friction. The lower rollers are of steel without facings. For driving the feed rollers there is provided a gear 48 on the shaft 8, Figures 2 and 3, which gear meshes with an idler 50 which in turn meshes with a gear 51 on the lower shaft 46. Near its other end but within the frame 2 the shaft 46 carries gear 52 meshing with gear 53 on the upper shaft 45. The gears 52 and 53 are of the same size so that the feed rollers rotate in a 1 to 1 ratio.

After the web has been formed into a bag tube by being folded over the former and passes between the feed rollers 44 it is severed into a bag length by mechanism including the so-called pinch bars and the striker bar. The pinch bars are also driven from the shaft 8 which has secured to it a pinion 55 meshing with a pinion 56 on the upper shaft 54 which carries the pinch bar 47, the pinions 55 and 56 also driving in a 1 to 1 ratio.

After the severance of the bag tube it passes on to mechanism which closes the bag bottom and this mechanism is of the usual and well-known construction and consists of upper and lower cylinders carrying respectively a tucker blade and clamp, which cylinders are likewise driven from the shaft 8. For this purpose said shaft carries a gear 57, Figure 7, meshing with an idler gear 58 carried by a stud shaft. The latter gear meshes with gear 60 on the lower cylinder 62 which is geared in a 1 to 1 ratio with the upper cylinder 64 carrying the tucker blade which blade is not shown but which is of the usual and well known construction.

The bag tube is severed by striker bar mechanism, which mechanism in the present instance has been somewhat modified in order to make it easier to accurately adjust the striker bars. This mechanism is constructed as follows: carried by the side frames 2 is a shaft 66 supporting a hub 67 having formed integral therewith two sprocket members 68. Supported by standards 70, one on each side of the machine, is a shaft 72 which carries sprockets corresponding to the sprockets 68 and about which pass two chains 73, one on each side of the machine, between which the striker bars 74 and 75 extend.

Figure 7:
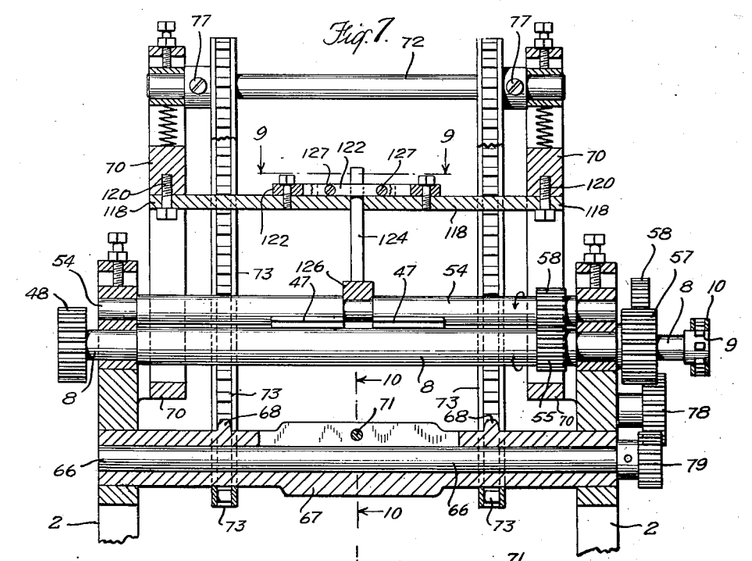
Figure 7 is a sectional view on the line 7—7, Figure 1.
Figures 8, 9, 10:
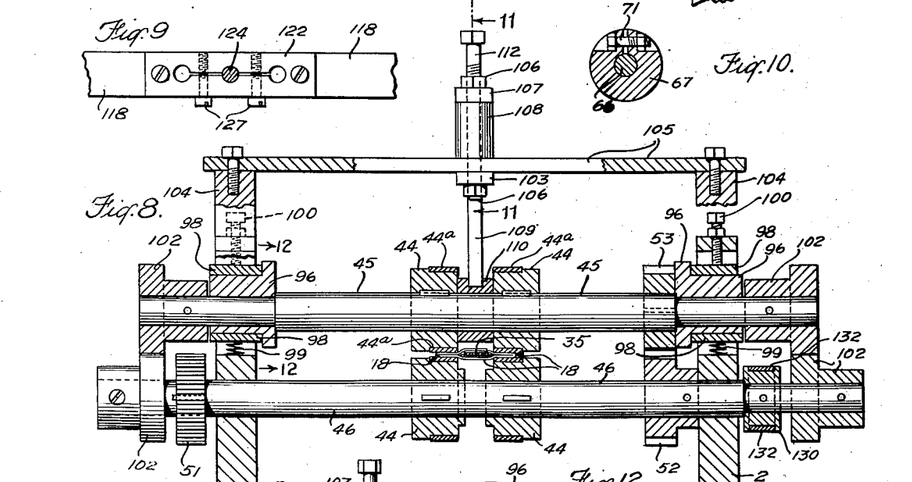
Figure 8 is a sectional view on the line 8—8, Figure 1.
Figure 9 is a section on the line 9—9, Figure 7.
Figure 10 is a section on the line 10—10, Figure 7.

The hub 67 has a slot milled into it near its central portion as indicated by the shading in Figure 7, which slot extends through the hub to the central bore and a bolt 71 passes through holes near the center as shown more particularly in Figure 10. By tightening up on the bolt the hub is clamped tightly to the shaft 66. The shaft 66 is driven from the shaft 8 through gear 57, idler 78 and pinion 79 secured to the shaft 66. Since the sprockets 68 are formed as a unit with the hub and the teeth subsequently milled, such teeth are in perfect alignment. When any adjustment of the sprocket chains is to be made the bolt 71 is loosened and the hub moved to the desired degree after which the bolt is again tightened. From this construction it is apparent that both sprockets 68 are adjusted in unison by a single adjustment of the hub on the shaft. The upper sprockets on the shaft 72 are independently adjustable as has been heretofore the practice, said sprockets having collars and set screws 77 which hold the sprockets in proper position on the shaft. After these sprockets have been once aligned they need not be changed when adjustment of the hub 67 is made.

The importance of the adjustment of the hub 67 in respect of the shaft 66 will be appreciated when it is recalled that this adjustment determines the relative timing of the pinch bar 47 and the striker bar and since in the present invention the slack in the bag tube is created by the striker bar with the pinch bar acting just at the moment when the slack is at a maximum, it is important that the adjustment between these two members be extremely accurate and it is also important that it may be made with convenience and certainty. The construction of the hub 67 with the sprockets 68 integral therewith makes this result easy of attainment.

In my application Serial No. 619,173 filed June 25, 1932 I have shown and described a bag machine in which the slack, which it is necessary to form in the bag tube before it is severed, is produced by the action of the striker bar and not by the action of the pinch bars as has been heretofore the custom. In the present construction the same timing of the parts is utilized and which timing is indicated by the position of the striker bar 74 in respect of the pinch bar 47 (Fig. 1). The pinch bar has not yet engaged the bag tube but the striker bar is just about to engage the bag tube. The slack in the tube is created entirely by the striker bar, the pinch bar engaging the bag tube just at the moment when the bag is severed by the knife edges 59 and 76 which sever respectively the lower and upper bag walls.

After a bag length has been severed from the tube and the bag bottom formed the bag passes on to delivering mechanism which may be of the usual and well-known construction and which is merely indicated more or less diagrammatically in the drawings and need not be specifically described.

It has been stated that the object of the invention was the better control and handling of the bag material both in the web and after the web has been folded into a bag tube. It is very important when very thin material is being handled, especially material such as cellophane, that the pressure of the various rollers on the web and tube shall be very accurately controlled and that the variations in pressure for different thicknesses of bag material shall be accurately compensated for. It is also important that the pressure shall remain constant during the various stages of bag formation. To this end I have provided a number of refinements whereby the main object of the invention is accomplished.

Reference has already been made to the positive drive of the roller 26. This relieves the web and bag tube of the strain which would necessarily be imposed upon it if the entire feeding of the paper were done through the feed rollers 44.

To aid in folding the material more accurately as it passes under the former and to prevent any slack which might otherwise occur I provide a soft rubber roller 80 shown in section in Figure 1 and in dotted lines in Figure 2. Said roller is supported by standards 82 on opposite sides of the machine frame and carries a bearing 83 which supports the roller yieldingly in engagement with the bag material, such yielding support being effected by means of one or more springs 84.

Mention has been made also of rollers engaging the upper portion of the bag tube and these will now be described more specifically. Just after the fold has been made it is engaged by a pair of rollers 86 which preferably are of rubber. These rollers are supported by arms 87 pivotably connected to brackets 88 vertically adjustable in bracket 89, which latter brackets are themselves adjustable along the plates 43.

In addition to the rollers 86 I further provide rollers 90 mounted in pivoted arms 92 supported in brackets 93 upstanding from the plates 43. To vary the amount of pressure exerted by the rollers 90 against the bag tube I provide weights 94 adjustable along the arms 92.

It has been stated that one of the features of the invention provides for very accurate adjustment of the feed rollers. Not only do I provide accurate adjustment but I also provide means whereby any rocking of the feed roller shafts is prevented. Referring to Figure 8, the upper feed roller shaft 45 is supported in eccentric bearings 96, which bearings are carried by bearing boxes 98 against which the springs 99 press with sufficient force to support the weight of the shaft and the parts carried thereby. Set screws 100 carried by the side frames bear against the bearing boxes 98 and enable the shaft 45 to be so adjusted that the upper and lower feed rollers are so spaced that they exert the proper pressure for the particular type of bag for which the machine is set to make. By reason of the springs 99 engaging the lower side of the bearing boxes the shaft 45 may yield in a downward direction and this yielding is provided to permit accurate adjustment. It is desirable, however, that the shaft be not permitted to rock and for guarding against this I provide what I call bearers mounted on the shafts 45 and 46. These bearers 102 consist of short collars secured to the respective shafts outside of the frame plates 2 and having very accurate cylindrical surfaces which in the properly adjusted position of the shafts do not contact. The adjustment is made by putting a thin piece of paper between the upper and lower bearers and adjusting the shaft 45 by means of the set screws 100 so that the paper is just barely caught by the bearers. Any tendency of the shaft 45 to rock therefore will be resisted by the bearers, the movement to effect contact between the same being merely that of the thickness of the piece of paper used in making the adjustment.

Figures 11, 12:
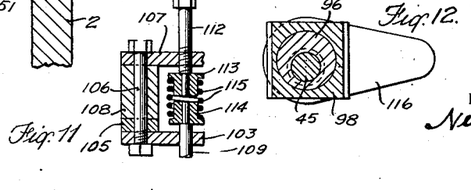
Figure 11 is a section on the line 11—11, Figure 8.
Figure 12 is a section on the line 12—12, Figure 8.
Figures 13, 14, 14A, 14B, 15:
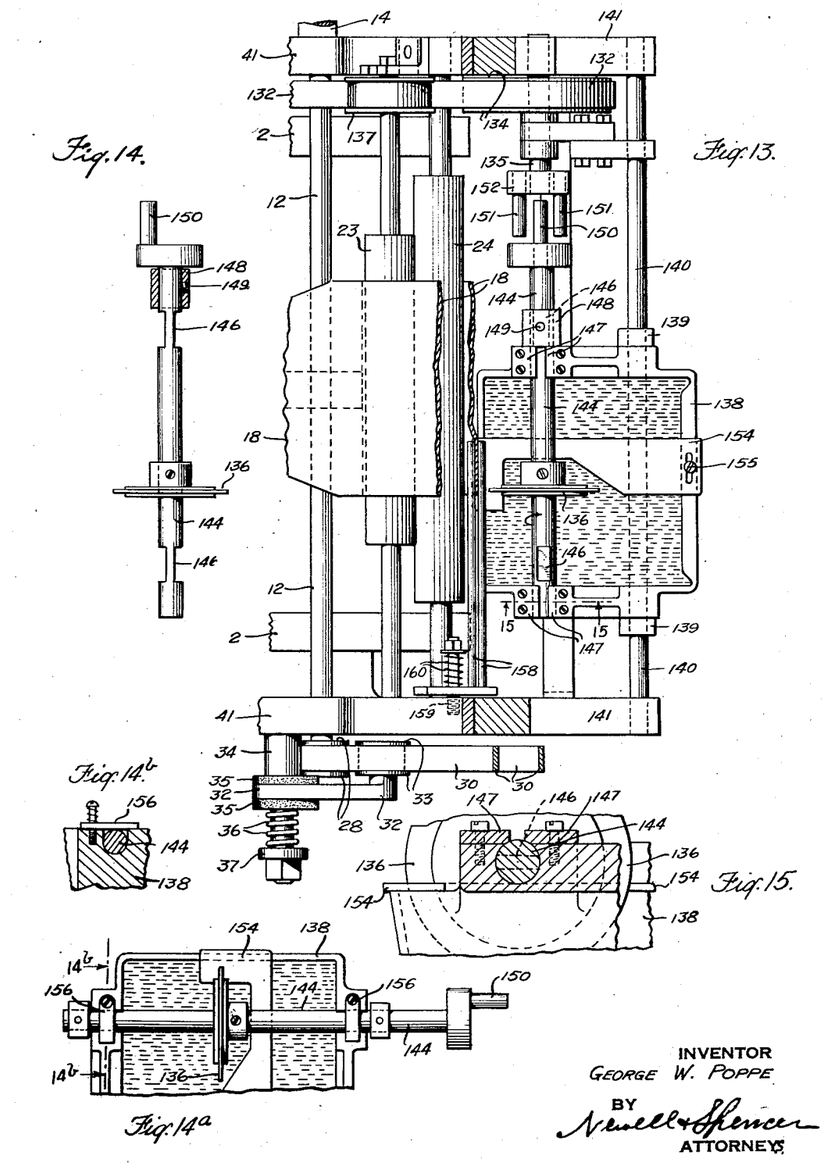

As a further means to prevent any tendency of the shafts 45 and 46 to separate I provide a central support for the shaft 45 yieldingly and adjustably holding said shaft against any upward thrusts to which it might be subjected. For this purpose the side frames are extended vertically as at 104 and support a horizontal plate 105. This plate is drilled near the centre and a bolt 106 serves to firmly support a lower arm 103 and an upper arm 107, a spacing collar 108 separating the two arms. A plunger 109 passes loosely through an opening in arm 103 and engages a depression in a collar 110 free on the shaft 45. In other words this collar is held from rotation by the plunger 109 while the shaft 45 freely rotates within the collar. A set screw 112 threaded into the arm 107 loosely engages a shouldered sleeve 113. Also loosely engaging the plunger 109 is a second shouldered sleeve 114 similar to the sleeve 113 but faced in the opposite direction as indicated in Figure 11. A spring 115 bears against these shoulders and causes a yielding force to be exerted on the plunger 109 which force shaped as shown in Figures 4 and 20 and is so adjusted on the shaft 16 as to make an incision centrally of the bag web prior to its being folded into a tube. The detailed construction of this die is shown in Figures 4 and 5, the cutting edge of the die being indicated by the reference character 162. The shank portion of the die is formed as indicated and is engaged by cylindrical plungers 163, Figure 5, which plungers are urged against the die by springs 164 seated in recesses in the die hub 165. The die shank is also provided with elongated slots 167 through which pins 167a are passed to limit the outward movement of the die against the action of the springs 164.

Figure 16:
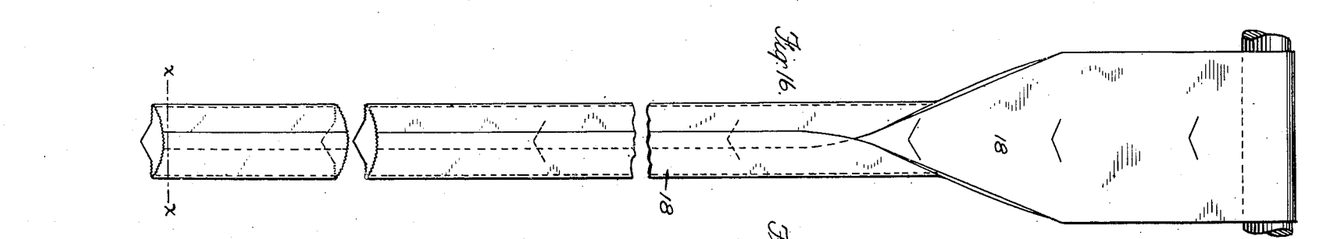
Figure 16 is a diagrammatic view showing the development of a bag.
Figures 17, 18, 19, 21, 22:
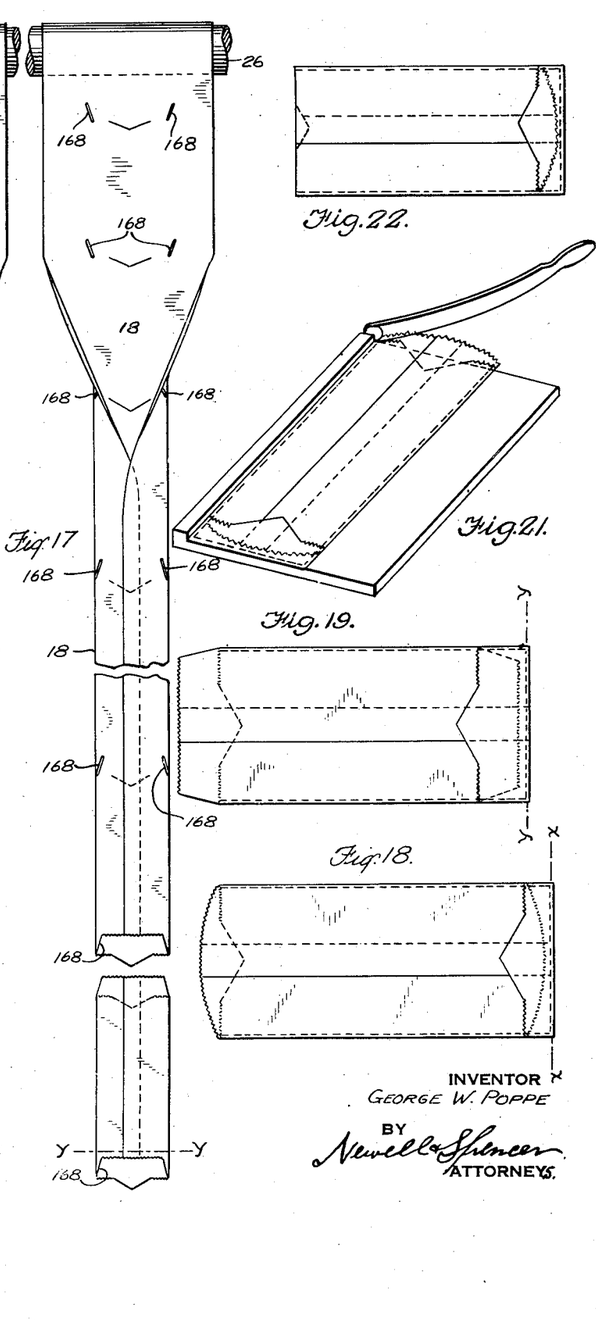
Figure 17 is a similar view of a different type of bag.
Figure 18 is a detail of a finished bag of a type developed in Figure 16.
Figure 19 is a similar view of the type of bag developed in Figure 17.
Figure 21 indicates the step of severing the top walls of the bag shown in Figure 18.
Figure 22 is a view of the bag of Figure 18 after severance of the top edges thereof.

Referring to Figure 16 which shows a development of a bag using the die above described, it will be noted that the cuts are made a bag length apart centrally of the bag tube and are non-rectilinear in shape and by reference to the lower portion of Figure 16 it will be noted also that when the bag is severed by the knife edges the incision made by the die forms a portion of the top of one bag wall. This follows from the fact that the bag wall is severed along a line which meets the end of the central non-rectilinear cuts. At the bottom of Figure 16 is shown a bag tube section prior to the folding of the bottom thereof, which fold is made along the line x—x and when so folded the finished bag presents the appearance shown in Figure 18. After the bag has been formed as here shown the top serrations are cut off by any suitable means such as an ordinary paper cutter shown in Figure 21, thereby presenting a bag having all of its top edges smooth and without serrations as shown in Figure 22. By reason of the manner in which the bag is formed from a bag tube the lower flap fits into the notch in the next preceding bag wall.

Figure 17 shows the development of a bag using the die as described above for making incisions centrally of the bag web and also the additional dies 166, Figure 20, which form the cuts 168. These dies 166 are similar in construction and mode of operation to the dies 60 shown in my Patent No. 1,798,168, granted March 31, 1931. By the process and machine there described the bag tube is severed in such a way that the transverse cuts meet the ends of the slits or cuts 168. It will also be noted by reference to Figure 17 that the ends of the central cut are in line with the lower ends of the cuts 168 so that when the bag tube is severed it has the appearance shown at the bottom of Figure 17. When the bag section is folded along the line y—y it has the appearance shown in Figure 19.

The bag of Figure 19 is subsequently subjected to the trimming operation whereby the serrated edges at the top of the bag are cut off by an ordinary paper cutter such as shown in Figure 21.

While I have shown and described a preferred form of my invention it is obvious that variations may be resorted to and some of the improvements may be used without others.

What I claim as new and patentable is:—

1. In a bag machine, the combination with a support for a roll of material, of cutters for forming cuts in the material spaced inwardly from the edges thereof, said cuts being located angularly in respect of the general direction of the web, means for making non-rectilinear cuts in the web between said pairs of cuts, a former, means for drawing the web over the former to form a tube with said non-rectilinear cuts central of one wall of the tube and transverse cutters to cut both walls of the tubes from opposite ends of the pairs of cuts, the cut in one wall of the bag also meeting the outer ends of said non-rectilinear cuts.

2. The process of forming a bag which consists of making cuts in the web in oppositely arranged pairs spaced from the edges of the web, making non-rectilinear cuts in the web between said pairs of cuts, folding the web into a bag tube so that said non-rectilinear cuts are central of one wall thereof, severing one wall of the tube along a line which meets the upper ends of a pair of cuts, severing the other wall along a line which meets the lower ends of the same pair of cuts and the outer ends of the central cuts and subsequently severing the top of the bag including both walls thereof along a line within the top of the shorter bag wall.

3. The process of forming a bag which consists in making cuts in a web of paper in oppositely arranged pairs spaced from the edges of said web, making non-rectilinear cuts in said web between the aforesaid cuts, folding the web into a bag tube so that the non-rectilinear cuts are central of one wall thereof, severing one wall of the tube along a line which meets the upper ends of a pair of cuts and severing the other wall along a line which meets the lower ends of said pair of cuts and the outer ends of the central cuts.

4. In the making of bags those steps which consist in making non-rectilinear cuts in a web, folding the web into a bag tube so that said cuts are central of one wall thereof, severing the tube into bag lengths by transverse cuts, the line of severance of the tube wall having the central cuts therein being along a line which meets the outer ends of said cuts, the line of severance of the other wall being from side to side of the tube and offset from the first said line of severance so that the edge of the wall of the tube which has been severed from side to side projects beyond the edge of the wall having the central cuts therein, and subsequently severing both walls of a bag length along a line within the edge of the wall having central cuts therein.

GEORGE W. POPPE.